United States Patent
Sealey, II et al.

(10) Patent No.: US 6,685,856 B2
(45) Date of Patent: Feb. 3, 2004

(54) USE OF THINNINGS AND OTHER LOW SPECIFIC GRAVITY WOOD FOR LYOCELL PRODUCTS METHOD

(75) Inventors: James E. Sealey, II, Federal Way, WA (US); W. Harvey Persinger, Jr., Enumclaw, WA (US); Kent Robarge, Sumner, WA (US); Mengkui Luo, Tacoma, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/336,320

(22) Filed: Jan. 2, 2003

(65) Prior Publication Data

US 2003/0186053 A1 Oct. 2, 2003

Related U.S. Application Data

(63) Continuation-in-part of application No. 09/842,274, filed on Apr. 24, 2001, which is a continuation-in-part of application No. 09/574,538, filed on May 18, 2000, now Pat. No. 6,331,354, which is a continuation-in-part of application No. 09/256,197, filed on Feb. 24, 1999, now Pat. No. 6,210,801.

(51) Int. Cl.[7] ............................. B29B 9/00; B29C 14/24
(52) U.S. Cl. ............................. 264/5; 264/12; 264/561; 264/187
(58) Field of Search .............................. 264/5, 12, 561, 264/187; 156/167

(56) References Cited

U.S. PATENT DOCUMENTS

| | | |
|---|---|---|
| 3,255,071 A | 6/1966 | Kleinert |
| 3,586,600 A | 6/1971 | Rich et al. |
| 3,632,469 A | 1/1972 | Wilder |

(List continued on next page.)

FOREIGN PATENT DOCUMENTS

| | | |
|---|---|---|
| CA | 2071185 A1 | 12/1992 |
| EP | 0 785 304 A2 | 7/1997 |
| FR | 2 735 794 A1 | 12/1996 |
| WO | WO 95/35399 A1 | 12/1995 |
| WO | WO 96/12063 A1 | 4/1996 |
| WO | WO 96/25552 A1 | 8/1996 |
| WO | WO 96/27700 A1 | 9/1996 |
| WO | WO 97/15713 A1 | 5/1997 |
| WO | WO 97/30196 A1 | 8/1997 |
| WO | WO 98/02662 A1 | 1/1998 |
| WO | WO 98/22642 A1 | 5/1998 |
| WO | WO 99/16960 A1 | 4/1999 |
| WO | WO 99/47733 A1 | 9/1999 |

OTHER PUBLICATIONS

Adamski, Z., et al., "Sawdust Utilization in Beech Pulp Production / Wykorzystanie Trocin w Produkcji Bukowych mas Celulozowych," *Roczniki Akademii Rolniczej w Posnaniu LXII*:3–10, 1975 [in Polish, summary in English].

Bail, C.M., "Sawdust Pulping Continues to Grow; Technology Improves Yield, Strength," *Pulp & Paper*, Feb. 1979, pp. 105–109.

(List continued on next page.)

*Primary Examiner*—Cynthia H. Kelly
*Assistant Examiner*—J. M. Gray

(57) ABSTRACT

The use of low specific gravity wood from thinning operations, for example, will produce a lower brownstock viscosity for a given kappa number target. A differential of 200-cP falling ball pulp viscosity has been detected from Kraft cooks of low and high specific gravity wood. Using low specific gravity wood can reduce the bleach stage temperature and the chemical dose needed in the bleach plant to produce lyocell pulp specifications. Low specific gravity wood also increases the ability to reduce pulp viscosity to very low levels without increasing the copper number of the pulp or the concentration of carbonyl in the pulp above acceptable levels.

2 Claims, 2 Drawing Sheets

U.S. PATENT DOCUMENTS

| | | | |
|---|---|---|---|
| 3,652,385 A | 3/1972 | Noreus et al. | |
| 3,652,387 A | 3/1972 | Wilder | |
| 3,684,651 A | 8/1972 | Reinhall | |
| 3,785,920 A | 1/1974 | Johansen | |
| 4,295,925 A | 10/1981 | Bentvelzen et al. | |
| 4,295,926 A | 10/1981 | Bentvelzen et al. | |
| 4,295,927 A | 10/1981 | Bentvelzen et al. | |
| 4,298,426 A | 11/1981 | Torregrossa et al. | |
| 4,338,158 A | 7/1982 | Bentvelzen | |
| 4,372,811 A | 2/1983 | Samuelson et al. | |
| 5,725,821 A | 3/1998 | Gannon et al. | |
| 6,042,769 A | 3/2000 | Gannon et al. | |
| 6,210,801 B1 * | 4/2001 | Luo et al. | 428/393 |
| 6,306,334 B1 * | 10/2001 | Luo et al. | 264/561 |
| 6,331,354 B1 * | 12/2001 | Sealey, II et al. | 428/393 |
| 6,491,788 B2 * | 12/2002 | Sealey, II et al. | 162/65 |

OTHER PUBLICATIONS

Bianchi, M.L., et al., "Bleaching of Commercial Pulps with $H_2O_2$ Catalyzed by Heteropolyacids," *Bioresource Technology* 68(1):17–21, Apr. 1999.

Bublitz, W.J., et al., "Stored Softwood Sawdust Can Age Rapidly and Affect Kraft Pulping Operations Significantly," in *Proceedings of Forest Biology Wood Chemistry Conference*, TAPPI, Madison, Wisc., Jun. 20–22, 1977, pp. 177–181.

Chang, H.–M., et al., "Delignification of High–Yield Pulps With Oxygen and Alkali," *Technical Association of the Pulp and Paper Industry* 57(5):123–126, May 1974.

Chawla, J.S., et al., "Fir Saw Dust as a Source of Cellulosic Raw Material for Pulping," *Indian Pulp and Paper* 21(5):347–351, Nov. 1966.

Coetzee, B., "Continuous Sapoxal Bleaching—Operating, Technical Experience," *Pulp Paper Mag. Can.* 75(6):T223–228, Jun. 1974.

Gagnon, P.F., et al., "Brightness Loss Reduction and ECF Bleaching of Kraft Pulp at Cartons St–Laurent la Tuque," in *Proceedings of 85th Annual Meeting*, PAPTAC, Jan. 28–29, 1999, pp. B349–B354.

Gustavsson, R., et al., "Evaluation of the Degradation of Cellulose and Delignification During Oxygen Bleaching," *Proceedings of the TAPPI Non–Sulfur Pulping Symposium*, Madison, WI, 1974, pp. 43–51.

Helberg, B.E., et al., "How Do Your Pulping Methods Compare to 125 Kraft Mills in the United States and Canada?" in *Proceedings of the Alkaline Pulping/Secondary Fibers Conference*, TAPPI, Nov. 7–10, 1977, Washington, D.C., pp. 323–328.

Johnston, G.W., "Weyco Mill Gets $300–Million Facelift," *Pulp & Paper Int'l*, Sep. 1977, pp. 57–60.

Krawchuk, D., "Oxygen Delignification: Proving Practical and Effective," *Mill Product News*, Sep./Oct. 1997, pp. 8–11.

Lauer, K., et al., "Viscose Grade Pulps From Sawdust of Loblolly Pine and Gum," *TAPPI* 43(11):165A–168A, Nov. 1960.

Levitin, N., et al., "Delignification of Spruce Sawdust With Chlorine Dioxide," *Journal of EPRS*, Dec. 1953, pp. 78–84.

Lovejoy, R.A., et al., "Sawdust Pulping With the Black Clawson Chemi–Pulper," in *Proceedings of the Alkaline Pulping / Secondary Fibers Conference*, TAPPI, Washington, D.C., Nov. 7–10, 1977, pp. 401–404.

Parthasarathy, V.R., et al., "Hydrogen Peroxide Reinforced Oxygen Delignification of Southern (Loblolly) Pine Kraft Pulp and Short Sequence Bleaching," *Proceedings of the TAPPI Pulping Conference*, 1989, pp. 539–547.

Procter, A.R., et al., "Simulated Hardwood Market Kraft Pulp From Western Red Cedar Sawdust," *TAPPI* 59(2):119–123, Feb. 1976.

Rodden, G., "Pioneering Work: Elk Falls Continues in Mini–Chip Pulp Production," *Pulp & Paper Canada* 98(10):18–19, 1997.

San Luis, J.M., et al., "Sawdust for Pulp and Paper Manufacture," *FORPRIDECOM Technical Note* 155:1–2, Jul. 1975.

Sorenson, D.R., "A Modern Sawdust Pulping Installation," in *Proceedings of the Alkaline Pulping Conference*, TAPPI, Williamsburg, Va., Oct. 27–29, 1975, pp. 97–104.

Sorenson, D.R., "Potlatch Expands Modern Sawdust Pulping System at Lewiston Mill," *Pulp & Paper*, Dec. 1976, pp. 58–61.

Taylor, T.G., "The Production of Bleached Kraft Market Pulp From Sawdust," *Pulp & Paper Canada* 78(1):53–57, Jan. 1977.

Wallis, A.F.A., et al., "Chemical Cellulose From Eucalyptus Regnans Wood by Autohydrolysis–Explosion–Extraction," *Carbohydrate Polymers* 17:103–110, 1992.

Weiner, J., et al., "Sawdust Pulping — An Annotated Bibliography: Special Number 65," *The Institute of Paper Chemistry*, Appleton, Wisc., 1975.

Winstead, T.E., "Rapid Kraft Pulping of Sawdust and Other Small Wood Particles," *Paper Trade Journal*, Oct. 16, 1972, pp. 52–53.

Woodings, C.R., "Regenerated Cellulosics," *Kirk–Othmer Encyclopedia of Chemical Technology*, 4th ed., John Wiley & Sons, vol. 10, "Explosives and Propellants to Flame Retardants for Textiles," pp. 696–726.

* cited by examiner

USE OF THINNINGS AND OTHER LOW SPECIFIC GRAVITY WOOD FOR LYOCELL PRODUCTS METHOD

CROSS-REFERENCES TO RELATED APPLICATIONS

This application is a continuation-in-part of application Ser. No. 09/842,274 filed Apr. 24, 2001, which in turn is a continuation-in-part of application Ser. No. 09/574,538, filed May 18, 2000, now U.S. Pat. No. 6,331,354, which is a continuation-in-part of application Ser. No. 09/256,197, filed Feb. 24, 1999, now U.S. Pat. No. 6,210,801. All the above applications are herein fully incorporated by reference.

FIELD OF THE INVENTION

The present invention is directed to pulps useful for making lyocell-molded bodies, including films, fibers, and non-woven webs, and to methods of making such pulps useful for making the lyocell-molded bodies, to the lyocell-molded bodies made from the pulps and to the methods for making the lyocell-molded bodies. In particular, the present invention is directed to using "young" wood (often characterized as "core wood", "juvenile wood", "low specific gravity wood" or, in some cases as "thinnings").

BACKGROUND OF THE INVENTION

Cellulose is a polymer of D-glucose and is a structural component of plant cell walls. These cells are referred to as fibers. Cellulosic fibers are especially abundant in tree trunks from which they are extracted, converted into pulp, and thereafter utilized to manufacture a variety of products.

Rayon is the name given to a fibrous form of regenerated cellulose that is extensively used in the textile industry to manufacture articles of clothing. For over a century, strong fibers of rayon have been produced by the viscose and cuprammonium processes. The latter process was first patented in 1890 and the viscose process two years later. In the viscose process cellulose is first steeped in a mercerizing strength caustic soda solution to form an alkali cellulose. The cellulose is then reacted with carbon disulfide to form cellulose xanthate, which is then dissolved in dilute caustic soda solution. After filtration and deaeration, the xanthate solution is extruded from submerged spinnerets into a regenerating bath of sulfuric acid, sodium sulfate, and zinc sulfate to form continuous filaments. The resulting viscose rayon is presently used in textiles and was formerly widely used for reinforcing rubber articles such as tires and drive belts.

Cellulose is also soluble in a solution of ammonia copper oxide. This property forms the basis for production of cuprammonium rayon. The cellulose solution is forced through submerged spinnerets into a solution of 5% caustic soda or dilute sulfuric acid to form the fibers, which are then decoppered and washed. Cuprammonium rayon is available in fibers of very low deniers and is used almost exclusively in textiles.

The foregoing processes for preparing rayon both require that the cellulose be chemically derivatized or complexed in order to render it soluble and therefore capable of being spun into fibers. In the viscose process, the cellulose is derivatized, while in the cuprammonium rayon process, the cellulose is complexed. In either process, the derivatized or complexed cellulose must be regenerated and the reagents used to solubilize it must be removed. The derivatization and regeneration steps in the production of rayon significantly add to the cost of this form of cellulose fiber. Consequently, in recent years attempts have been made to identify solvents that are capable of dissolving underivatized cellulose to form a dope of underivatized cellulose from which fibers can be spun.

One class of organic solvents useful for dissolving cellulose are the amine N-oxides, in particular the tertiary amine N-oxides. For example, Graenacher, in U.S. Pat. No. 2,179,181, discloses a group of amine oxide materials suitable as solvents. Johnson, in U.S. Pat. No. 3,447,939, describes the use of anhydrous N-methylmorpholine-N-oxide (NMMO) and other amine N-oxides as solvents for cellulose and many other natural and synthetic polymers. Franks et al., in U.S. Pat. Nos. 4,145,532 and 4,196,282, deal with the difficulties of dissolving cellulose in amine oxide solvents and of achieving higher concentrations of cellulose.

Lyocell is an accepted generic term for a cellulose fiber precipitated from an organic solution in which no substitution of hydroxyl groups takes place and no chemical intermediates are formed. Several manufacturers presently produce lyocell fibers, principally for use in the textile industry. For example, Acordis, Ltd. presently manufactures and sells a lyocell fiber called Tencel® fiber.

Currently available lyocell fibers are produced from wood pulps that have been extensively processed to remove non-cellulose components, especially hemicellulose. These highly processed pulps are referred to as dissolving grade or high alpha (or high α) pulps, where the term alpha (or α) refers to the percentage of cellulose. Thus, a high alpha pulp contains a high percentage of cellulose, and a correspondingly low percentage of other components, especially hemicellulose. The processing required to generate a high alpha pulp significantly adds to the cost of lyocell fibers and products manufactured therefrom.

Since the conventional Kraft process stabilizes residual hemicelluloses against further alkaline attack, it is not possible to obtain acceptable high alpha pulps for lyocell products, through subsequent treatment of Kraft pulp in the conventional bleaching stages. In order to prepare high alpha pulps by the Kraft process, it is necessary to pretreat the wood chips in an acid phase before the alkaline pulping stage. A significant amount of material, primarily hemicellulose, on the order of 10% or greater of the original wood substance, is solubilized in this acid phase pretreatment and thus process yields drop. Under these conditions, the cellulose is largely resistant to attack, but the residual hemicelluloses are degraded to a much shorter chain length and are therefore removed to a large extent in the subsequent Kraft cook by a variety of hemicellulose hydrolysis reactions or by dissolution. The disadvantage of conventional high alpha pulps used for lyocell is the resulting loss of yield by having to eliminate hemicelluloses.

In view of the expense of producing commercial high alpha pulps, it would be desirable to have alternatives to conventional high alpha pulps for making lyocell products. In addition, manufacturers would like to minimize the capital investment necessary to produce such types of pulps by utilizing existing capital plants. Thus, there is a need for relatively inexpensive, low alpha (e.g., high yield, high hemicellulose) pulps that have attributes that render them useful in lyocell-molded body production.

In U.S. Pat. No. 6,210,801, fully incorporated herein by reference in its entirety, assigned to the assignee of the present application, low viscosity, high hemicellulose pulp is disclosed that is useful for lyocell-molded body production. The pulp is made by reducing the viscosity of the cellulose without substantially reducing the hemicellulose content. Such processes use an acid, or an acid substitute, or other methods therein described.

While the methods described in the '801 patent are effective at reducing the average degree of polymerization (D.P.) of cellulose without substantially decreasing the hemicellulose content, a further need existed for a process that did not require a separate copper number reducing step and which was readily adaptable to pulp mills that have oxygen reactors, multiple alkaline stages and/or alkaline conditions suitable for substantial D.P. reduction of bleached or semi-bleached pulp. Environmental concerns have also generated a great interest in using bleaching agents that reduce the use of chlorine compounds. In recent years, the use of oxygen as a delignifying agent has occurred on a commercial scale. Examples of equipment and apparatus useful for carrying out an oxygen stage delignification process are described in U.S. Pat. Nos. 4,295,927; 4,295,925; 4,298,426; and 4,295,926. In U.S. Pat. No. 6,331,554, assigned to the assignee of the present application, fully incorporated herein by reference in their entirety, a high hemicellulose, low viscosity pulp is disclosed that is useful for lyocell-molded body formation. The pulp is made from an alkaline pulp by treating the alkaline pulp with an oxidizing agent in a medium to high consistency reactor to reduce the D.P. of the cellulose, without substantially reducing the hemicellulose or increasing the copper number.

Further efforts to reduce the cost of making lyocell-molded bodies has resulted in U.S. Application No. 09/842,274, fully incorporated by reference in its entirety. In the '274 application, the assignee of the present invention describes pulps made from sawdust and other low fiber length wood using a procedure similar to that of the '554 patent. These pulps are high in hemicellulose and low in viscosity, which makes them especially suitable for lyocell-molded body formation.

The forest industry continues to generate vast quantities of byproducts in the normal course of day-to-day forestry management and wood processing. These byproducts are for the most part underutilized. The need to conserve resources by utilizing wood byproducts in new ways presents a unique opportunity. It would be advantageous to develop a low cost pulp that is useful for making lyocell-molded bodies from all this underutilized wood, namely from the core wood or young or juvenile wood such as thinnings, hereafter referred to as low specific gravity wood. Thus, presenting a low cost alternative to the highly refined high-alpha pulps.

SUMMARY OF THE INVENTION

One embodiment of the invention is a pulp having at least 7% by weight hemicellulose; a viscosity of less than or about 32 cP; a copper number less than or about 2; a weighted average fiber length less than or about 2.7 mm; and a coarseness less than or about 23 mg/100 m. In another embodiment of the invention, a method for making lyocell-molded body is provided. The method includes dissolving a pulp in a solvent to form a cellulose solution; forming a lyocell-molded body from the solution; and regenerating the molded body, wherein the pulp has at least 7% by weight hemicellulose, a viscosity less than or about 32 cP; a copper number less than or about 2; a weighted average fiber length less than or about 2.7 mm; and a coarseness less than or about 23 mg/100 m. The method can use a meltblowing, centrifugal spinning, spun bonding, or dry-jet wet technique.

In another embodiment of the invention, a method of making a pulp is provided. The method includes pulping of wet material with a specific gravity less than or about 0.41 using an alkaline pulping process; and bleaching the pulp to reduce the viscosity of the pulp to or about 32 cP or lower. The bleached pulp has at least 7% hemicellulose by weight, a copper number less than or about 2, a weighted average fiber length less than or about 2.7 mm, and a coarseness less than or about 23 mg/100 m.

In another embodiment of the invention, a lyocell product is provided. The lyocell product has at least 7% hemicellulose by weight, and cellulose, wherein the pulp used to make the product has a viscosity less than or about 32 cP, a copper number less than or about 2, a weighted average fiber length less than or about 2.7 mm, and a coarseness less than or about 23 mg/100 m. Lyocell products can be fibers, films, or non-woven webs, for example.

The use of low specific gravity wood can produce a lower brownstock viscosity for a given kappa number target. Using wood with low specific gravity values reduce the bleach stage temperature and the chemical dose needed in the bleach plant to produce pulp having acceptable lyocell specifications. Low specific gravity wood results in very low viscosity levels without increasing the copper number of the pulp or the concentration of carbonyl in the pulp above acceptable levels. The process does not use an acid phase pretreatment prior to pulping, and the subsequent bleaching conditions do not result in a substantial decrease in hemicellulose content.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
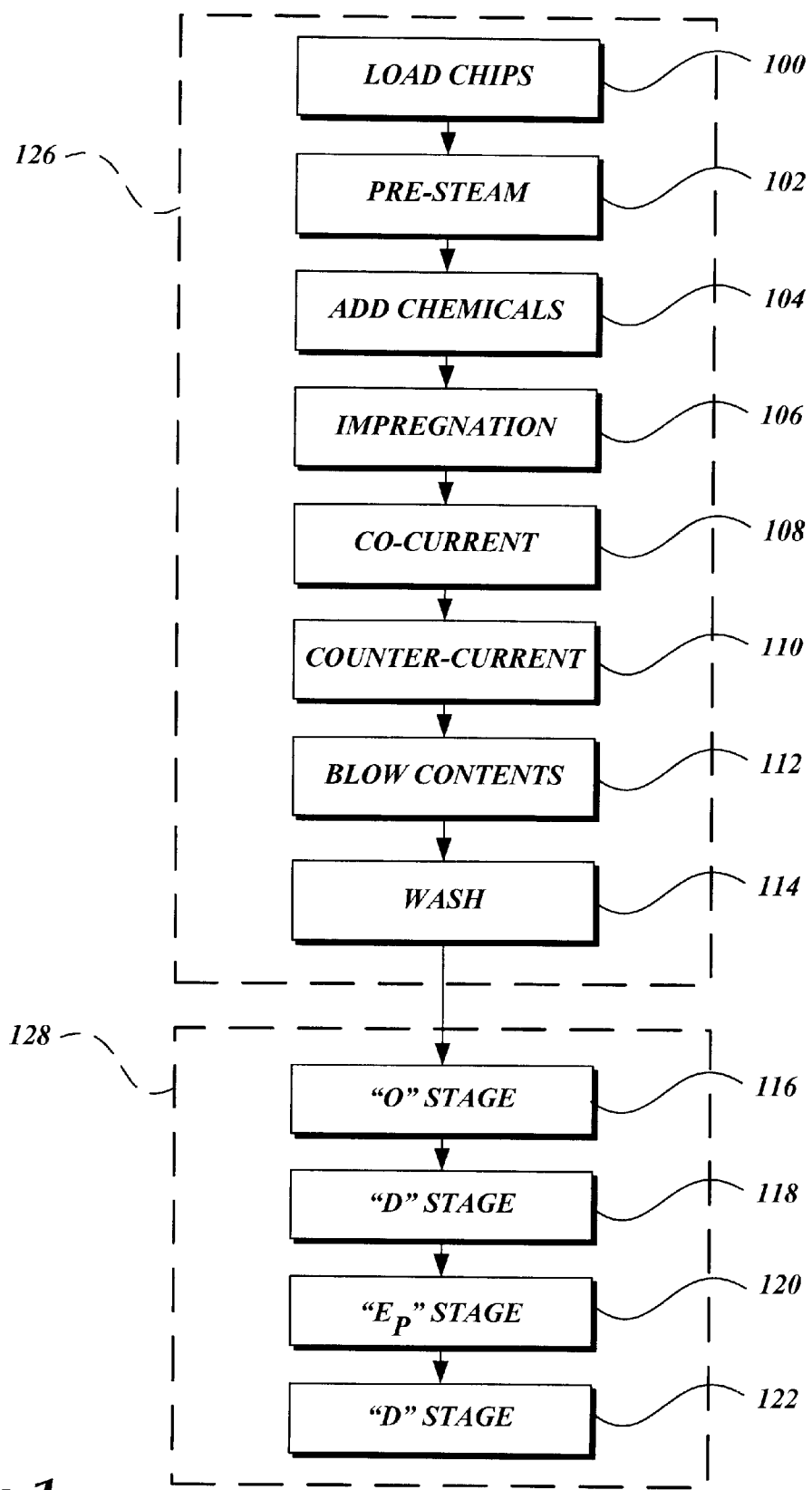
FIG. 1 is a flowsheet illustrating one embodiment of a method of making a pulp according to the present invention.

Referring now to FIG. 1, a suitable method to produce a lyocell dissolving pulp from low specific gravity wood is illustrated. The method may be considered to include two broad processing areas, pulping depicted as block 126 and bleaching depicted as block 128.

In block 100, low specific gravity wood chips are loaded or fed into a digester. Specific gravity, according to *The Handbook of Pulping and Papermaking*, 2d ed., by Christopher J. Biermann, is the (unit less) ratio of the solid wood density to the density of water at the same temperature. As used herein, specific gravity is the average specific gravity of any population of wood feedstock material. The solid wood density may be determined using the green volume, the oven-dry volume, or intermediate volumes. The wood chips used in practicing the invention can be made from any cellulose source. Contrary to conventional thinking, low specific gravity wood has been found to be suitable for use as a source of cellulose for making lyocell-molded bodies. A suitable range of low specific gravity wood used for the present invention is any wood material having a specific gravity about equal or less than 0.41. Low specific gravity wood results in a lower brownstock pulp viscosity, which is believed to reduce the use of bleaching chemicals in the bleach plant. Representative sources of low specific gravity wood may be derived from "thinnings" and "juvenile" wood. Juvenile wood is defined as the first 10 growth rings surrounding the pith, according to Biermann. However, others define it as wood formed near the pith of the tree, often characterized by wide growth rings, lower density, and shorter fibers. However, in some instances the juvenile wood may extend to the 15-ring or more. Specific gravity increases with the increasing height of the tree, so specific gravity at 16 feet, 32 feet, or 48 feet is incrementally greater than at the butt of the tree. In some embodiments, the specific gravity will be less than 0.41, and could be less than 0.38, 0.36, 0.34, 0.32, or 0.30, or less.

Digesters for use in the present invention can include any digester suitable to pulp low specific gravity wood. One example of a suitable digester is a continuous digester that is often referred to as a "Kamyr" digester. (It should be noted that Kamyr is the name of a Company that designed and built such digesters and as such, the term Kamyr is loosely associated with a continuous digester. Kamyr no longer exists as a Company. Such continuous digesters are supplied by Kvaerner.) These digesters have been used in the pulp and paper industry for several years with the first one being installed in Sweden in 1950. Over the years, the modifications have been made to these digesters to improve their operation. The digester system may be either a single vessel or a two-vessel system.

"Kamyr" digesters are typically used in Kraft or alkaline wood pulping, but may also be used in semi-chemical pulping methods. Other continuous digesters, such as the M&D digester and the Pandia digester, are also suitable to use in the present invention. However, the present invention can also be practiced using any batch or other continuous digester.

Referring to FIG. 1, within the pulping process, block 126, there are several operations, depicted as blocks 100–116. Loading, or feeding chips as discussed above, occurs in block 100. The wood chips may be presteamed prior to cooking, block 102. Steam at atmospheric pressure preheats the chips and drives off air so that liquor penetration will be enhanced. After the pre-steaming operation is completed, cooking liquor, referred to as white liquor, containing the pulping chemicals may be added to the chips, block 104. The white liquor and chips are then fed into the digester. In Kraft pulping, the active chemical compounds are NaOH and $Na_2S$. Other chemicals may be added to influence or impart desirable effects on the pulping process. These additional chemicals are well known to those of skill in the art. The present invention provides a lower brownstock pulp viscosity from relatively lower specific gravity wood as composed with wood having a higher specific gravity, i.e., specific gravity is related to Kappa number.

Impregnation, block 106, is the period during which the chemicals are allowed to impregnate the low specific gravity wood material. Good liquor penetration helps assure a uniform cooking of the chips.

"Cooking" occurs in blocks 108 and 110. The co-current liquid contact operation, block 108, is followed by the counter-current liquid contact operation, block 110. Cooking of the low specific gravity wood occurs during these two operations. In either block 108 or 110, the cooking liquor and chips can be brought to temperature.

Digester washing, block 112, is accomplished by introducing wash liquor into the bottom of the digester and having it flow counter-current to the cooked pulp. Cooking for the most part ends when the pulp encounters the cooler wash liquor.

Upon completion of the cook operation, and digester washing, the digester contents are blown, block 112. Digester blowing involves releasing the wood chips and liquor at atmospheric pressure. The release occurs with a sufficient amount of force to cause fiber separation. If desired, the blow tank may be equipped with heat recovery equipment to reduce operating expenses.

In block 114, the pulp is sent from the blow tank to external brownstock pulp washers. The separation of black liquor from the pulp occurs at the brownstock washers.

In one embodiment of a method of making a pulp from low specific gravity wood to be used in the manufacture of lyocell-molded bodies, the time allowed for impregnation in block 106 is about 35 minutes. The initial percent effective alkali is about 8.5. The percent effective alkali at 5 minutes is about 1.6. The percent sulfidity is about 29. The liquor ratio is about 4. The initial temperature is about 110° C. The residual grams per liter of effective alkali is about 9.63. The residual percent effective alkali is about 3.85. The pH is about 12.77, and the H factor is about 2.

In one embodiment of the co-current operation, block 108, the percent effective alkali is about 4.2. According to Biermann, the effective alkali is the ingredients that will actually produce alkali under pulping conditions. The percent sulfidity is about 29. According to Biermann, the sulfidity is the ratio of sodium sulfide to the active alkali, expressed as a percent. The liquor addition time is about 1 minute. The temperatures may be ramped to the final cooking temperature with a hold at one or more temperatures. The first temperature platform is about 154° C. The time to reach the temperature is about 9 minutes and the time at the temperature is about 5 minutes. A second and higher cooking temperature at the co-current operation is provided at 170° C. The time to reach the second temperature is about 51 minutes and the time at temperature is about 3 minutes. The effective alkali remaining after a cook operation is called the residual alkali. The residual grams per liter of effective alkali is about 9.42, following the co-current operation. The residual percent effective alkali is about 3.77. The pH is about 12.92, and the H factor is about 649.

In one embodiment of the counter-current operation, block 110, the percent effective alkali is about 8. The percent sulfidity is about 29.2. Capability also exists for ramping to two different temperatures in the counter-current step. However, in one embodiment, the first and second cooking temperatures are both about 171° C. The time to reach temperature is about 54 minutes and the time at the temperature is about 162 minutes. The effective alkali grams per liter is about 16.0. The displacement rate is about 93 ml per minute. The displacement volume is about 20 liters. The volumes given here are relatively small, since the method was tested on a lab-scale bench reactor. However, with the parameters provided herein, and with no undue experimentation, the process can be scaled to any rate. The residual grams per liter of effective alkali is about 9.95. The residual percent effective alkali is about 3.98. The pH is about 12.74 and the H factor is about 3877. In one embodiment, the total time is about 319 minutes and the percent effective alkali for the total cook is about 22.3.

In one embodiment, after washing, the viscosity of the brownstock pulp is about 153 cP. The total yield on oven dried wood is about 41.04.

Following the pulping process, generally depicted as reference numeral 126 in FIG. 1, the brownstock pulp made from low specific gravity wood is bleached to reduce its viscosity. The bleaching process does not lead to a substantial reduction of the hemicellulose content of the pulp. The method according to the invention produces a bleached dissolving pulp that is suitable for lyocell-molded body production. Bleaching of chemical pulps involves the removal of lignin with an attendant decrease in the pulp fiber length and viscosity. However, the bleaching process does not cause a substantial reduction to the hemicellulose content of the pulp. Bleaching brownstock pulp made from low specific gravity wood may require fewer chemicals than the conventional highly refined, high-alpha pulps presently being used for lyocell.

In one embodiment, the low specific gravity brownstock pulp made according to the invention can be treated with various chemicals at different stages in the bleach plant. The stages are carried out in vessels or towers of conventional design. One representative bleaching sequence is $ODE_pD$. The operations occurring in the bleaching plant are represented collectively by reference numeral 128 in FIG. 1. Other embodiments of post bleaching the pulp after pulping are described in U.S. Pat. No. 6,331,354, and U.S. application Ser. No. 09/842,274, incorporated herein by reference in their entirety.

The first stage of bleaching is an O stage, block 116. The O stage comprises bleaching with oxygen. However, according to Biermann, some consider oxygen bleaching to be an extension of the pulping process. Oxygen bleaching is the delignification of pulps using oxygen under pressure. The oxygen is considered to be less specific for the removal of lignin than the chlorine compounds. Oxygen bleaching takes place in an oxygen reactor. Suitable oxygen reactors capable of carrying out the method of the present invention are described in U.S. Pat. Nos. 4,295,925; 4,295,926; 4,298,426; and 4,295,927, fully incorporated herein by reference in their entirety. The reactor can operate at a high consistency, wherein the consistency of the feedstream to the reactor is greater than 20% or it can operate at medium consistency, where the medium consistency ranges between 8% up to 20%. Preferably, if a high consistency oxygen reactor is used, the oxygen pressure can reach the maximum pressure rating for the reactor, but more preferably is greater than 0 to about 85 psig. In medium consistency reactors, the oxygen can be present in an amount ranging from greater than 0 to about 100 pounds per ton of the pulp, but is more preferably about 50 to about 80 pounds per ton of pulp. The temperature of the O stage ranges from about 100° C. to about 140° C.

In one embodiment of the method to make a pulp suitable to be used in making lyocell-molded bodies, a D stage, block 118 follows the O stage, block 116. The D stage comprises bleaching the pulp coming from the oxygen reactor with chlorine dioxide. Chlorine dioxide is more selective than oxygen for removing lignin. The amount of chlorine dioxide used in this stage ranges from about 20 to about 30 lb/ton, which may be lower than a conventional bleach plant that processes pulp from wood chips with a specific gravity not within the low specific gravity range of this invention. The temperature of the D stage ranges from about 50° C. to about 85° C.

In one embodiment of the method to make a pulp suitable to be used in making lyocell-molded bodies, an $E_p$ stage, block 120, follows the D stage, block 118. The $E_p$ stage is the hydrogen peroxide reinforced extraction stage where lignin is removed from the pulp using caustic in an amount ranging from about 20 to about 50 lb/ton. The amount of hydrogen peroxide ranges from about 20 to about 60 lb/ton, which may be lower than a conventional bleach plant that processes pulp from wood chips having a specific gravity not considered within the low specific gravity range of this invention. The temperature of the Ep stage ranges from about 75 to about 95° C.

In one embodiment, a second D stage, block 122, follows the $E_p$ stage, block 120. The amount of chlorine dioxide used in this stage ranges from 10 to about 30 lb/ton, which may be lower than a conventional bleach plant that processes pulp from wood chips having a conventional specific gravity not considered to be within the low specific gravity range of this invention. The temperature of the D stage ranges from about 60° C. to about 90° C.

One embodiment of a pulp made from low specific gravity wood has a hemicellulose content of at least 7% hemicellulose, a pulp viscosity less than 32 cP, a copper number less than 2.0, and in some instances less than 1.3 (TAPPI T430), a weighted average fiber length less than 2.7 mm, and a coarseness less than 23 mg/100 m. Other embodiments of pulps made according to the present invention have a combined copper, manganese, and iron content less than 2 ppm, a total metal load less than 300 ppm, and a silicon content less than 50 ppm. Lyocell molded bodies made from the pulps of the invention will have a correspondingly high hemicellulose content of at least 7% by weight, and cellulose.

Hemicellulose is measured by a sugar content assay based on TAPPI standard T249 hm-85.

Methods for measuring pulp viscosity are well known in the art, such as TAPPI T230. Copper number is a measure of the carboxyl content of pulp. The copper number is an empirical test used to measure the reducing value of cellulose. The copper number is expressed in terms of the number of milligrams of metallic copper, which is reduced from cupric hydroxide to cuprous oxide in an alkaline medium by a specified weight of cellulosic material. The degree to which the copper number changes during the bleaching operation is determined by comparing the copper number of the brownstock pulp entering the bleaching plant and the copper number of the bleached pulp after the bleaching plant. A low copper number is desirable because it is generally believed that a high copper number causes cellulose and solvent degradation during and after dissolution of the bleached pulp to form a dope.

The weighted average fiber length (WAFL) is suitably measured by a FQA machine, model No. LDA93-R9704, with software version 2.0, made by the Optest Company of Hawkesbury, Ontario, Canada.

Coarseness is measured using Weyerhaeuser Standard Method WM W-FQA.

Transition metals are undesirable in pulp because they accelerate the degradation of cellulose and NMMO in the lyocell process. Examples of transition metals commonly found in bleached pulps include iron, copper, and manganese. Preferably, the combined metal content of these three metals in the pulps of the invention is less than about 20 ppm by Weyerhaeuser Test No. AM5-PULP-1/6010.

Additionally, pulps of the invention have a total metal load of less than 300 ppm by Weyerhaeuser Test No. AM5-PULP-1/6010. The total metal load refers to the combined amount, expressed in units of parts per million (ppm), of nickel, chromium, manganese, iron and copper.

Once the pulp has been bleached to reduce its viscosity without substantially increasing its copper number or decreasing the hemicellulose content, the pulp can either be washed in water and transferred to a bath of organic solvent, such as N-methyl-morpholine-N-oxide (NMMO), for dissolution prior to lyocell-molded body formation. Alternatively, the bleached washed pulp can be dried and broken into fragments for storage and/or shipping in a roll, sheet or bale, for example.

In order to make lyocell products from the low specific gravity wood pulps, the pulp is first dissolved in an amine oxide, preferably a tertiary amine oxide. Representative examples of amine oxide solvents useful in the practice of the present invention are set forth in U.S. Pat. No. 5,409,532, incorporated herein by reference in its entirety. The preferred amine oxide solvent is NMMO. Other representative examples of solvents useful in the practice of the present invention include dimethylsulfoxide (D.M.S.O.), dimethylacetamide (D.M.A.C.), dimethylformamide (D.M.F.) and caprolactan derivatives. The bleached pulp is dissolved in amine oxide solvent by any known means such as ones set forth in U.S. Pat. Nos. 5,534,113; 5,330,567; and 4,246,221, incorporated herein by reference in their entirety. The pulp solution is called dope. The dope is used to manufacture lyocell fibers, films, and nonwovens or other products, by a variety of techniques, including melt blowing, spunbonding, centrifugal spinning, dry-jet wet, or any other suitable method. Examples of some of these techniques are described in U.S. Pat. Nos. 6,235,392; 6,306,334; 6,210,802; and 6,331,354, incorporated herein by reference in their entirety. Examples of techniques for making films are set forth in U.S. Pat. Nos. 5,401,447; and 5,277,857, incorporated herein by reference in their entirety. Meltblowing, centrifugal spinning and spunbonding used to make lyocell fibers and nonwoven webs are described in U.S. Pat. Nos. 6,235,392 and 6,306,334, incorporated herein by reference in their entirety. Dry-jet wet techniques are more fully described in U.S. Pat. Nos. 6,235,392; 6,306,334; 6,210,802; 6,331,354; and 4,142,913; 4,144,080; 4,211,574; 4,246,221; incorporated herein by reference in their entirety.

One embodiment of a method for making lyocell products, including fibers, films, and nonwoven webs from dope derived from pulp is provided, wherein the pulp is made from low specific gravity wood, the pulp having at least 7% hemicellulose, a viscosity less than or about 32 cP, a copper number less than or about 2, a weighted average fiber length less than or about 2.7 mm, and a coarseness less than or about 23 mg/100 m. The method involves extruding the dope through a die to form a plurality of filaments, washing the filaments to remove the solvent, regenerating the filaments with a nonsolvent, including water or alcohol, and drying the filaments.

Figure 2:
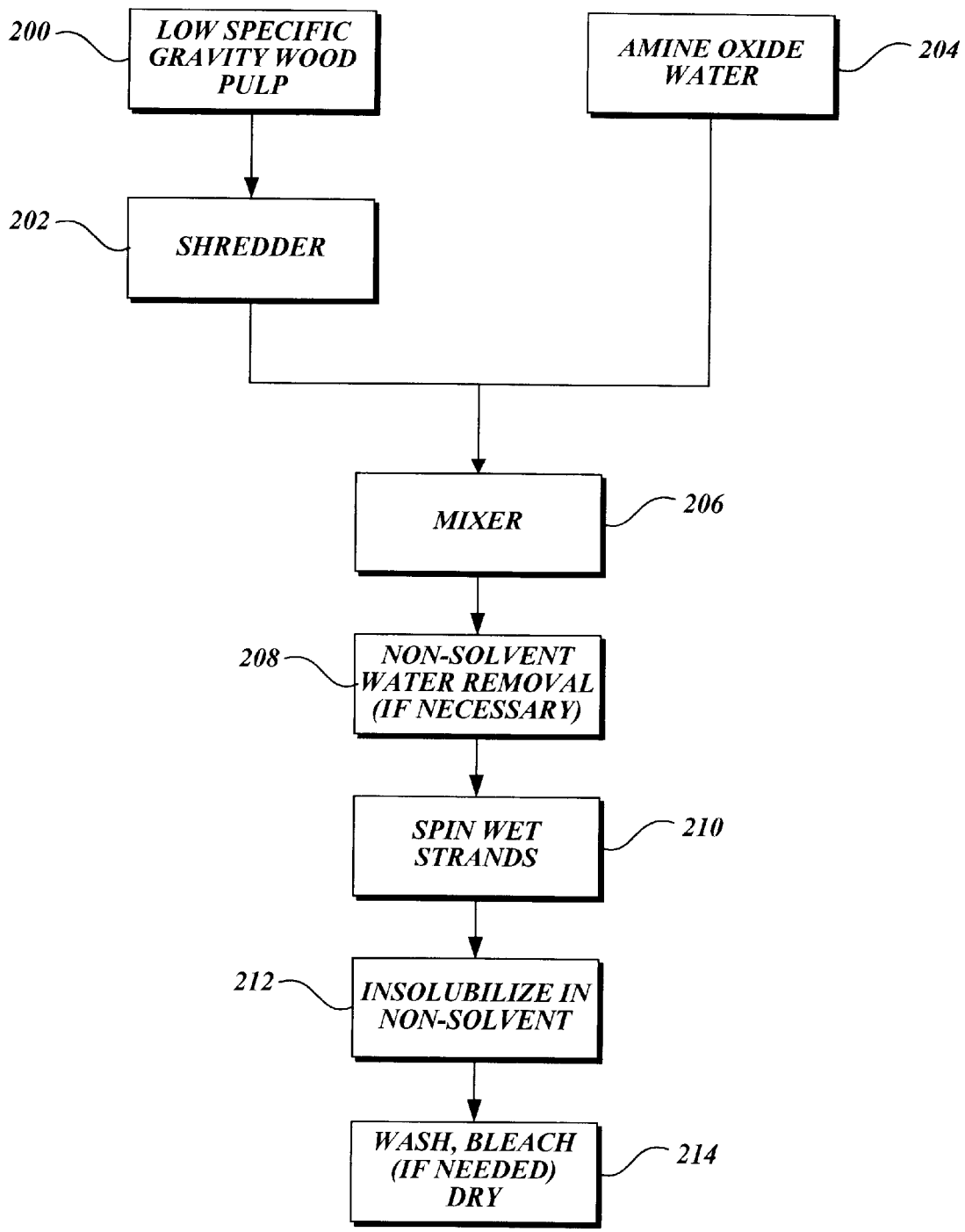
FIG. 2 is a flow sheet illustrating one embodiment of a method of making a lyocell-molded body according to the present invention.

FIG. 2 shows a block diagram of one embodiment of a method for forming lyocell fibers from the pulps made from low specific gravity wood according to the present invention. Starting with low specific gravity wood pulp in block 200, the pulp is physically broken down, for example by a shredder in block 202. The pulp is dissolved with an amine oxide-water mixture to form a dope, block 204. The pulp can be wetted with a nonsolvent mixture of about 40% NMMO and 60% water. The mixture can be mixed in a double arm sigma blade mixer and sufficient water distilled off to leave about 12–14% based on NMMO so that a cellulose solution is formed, block 208. Alternatively, NMMO of appropriate water content may be used initially to eliminate the need for the vacuum distillation block 208. This is a convenient way to prepare spinning dopes in the laboratory where commercially available NMMO of about 40–60% concentration can be mixed with laboratory reagent NMMO having only about 3% water to produce a cellulose solvent having 7–15% water. Moisture normally present in the pulp should be accounted for in adjusting the water present in the solvent. Reference is made to articles by Chanzy, H., and A. Peguy, *Journal of Polymer Science, Polymer Physics Ed.* 18:1137–1144 (1980), and Navard, P., and J. M. Haudin, *British Polymer Journal*, p. 174 (December 1980) for laboratory preparation of cellulose dopes in NMMO and water solvents.

The dissolved, bleached pulp (now called the dope) is forced through extrusion orifices in a process called spinning, block 210, to produce cellulose filaments that are then regenerated with a non-solvent, block 202. Spinning to form lyocell-molded bodies, including fibers, films, and nonwovens, may involve meltblowing, centrifugal spinning, spun bonding, and dry-jet wet techniques. Finally, the lyocell filaments or fibers are washed, block 214.

The solvent can either be disposed of or reused. Due to its high costs, it is generally undesirable to dispose of the solvent. Regeneration of the solvent suffers from the drawback that the regeneration process involves dangerous, potentially explosive conditions.

The following examples merely illustrate the best mode now contemplated for practicing the invention, but should not be construed to limit the invention.

EXAMPLE 1

A commercial continuous extended delignification process was simulated in the laboratory utilizing a specially built reactor vessel with associated auxiliary equipment, including circulating pumps, accumulators, and direct heat exchangers, etc. Reactor temperatures were controlled by indirect heating and continuous circulation of cooking liquor. The reactor vessel was charged with a standard quantity of equivalent moisture free wood. An optional atmospheric pre-steaming step may be carried out prior to cooking. A quantity of cooking liquor, ranging from about 50% to 80% of the total, was then charged to the digester along with dilution water to achieve the target liquor to wood ratio. The reactor was then brought to impregnation temperature and pressure and allowed to remain for the target time. Following the impregnation period, an additional portion of the total cooking liquor was added to the reactor vessel, ranging from about 5% to 15% of the total. The reactor was then brought to cooking temperature and allowed to remain there for the target time period to simulate the co-current portion of the cook.

Following the co-current portion of the cook, the remainder of the cooking liquor was added to the reactor vessel at a fixed rate. The rate is dependent on the target time period and proportion of cooking liquor used for this step of the cook. The reactor was controlled at a target cooking temperature and allowed to remain there during the simulation of the counter-current portion of the cook. Spent cooking liquor was withdrawn from the reactor into an external collection container at the same fixed rate. At the end of the cook, the reactor vessel was slowly depressurized and allowed to cool below the flash point. The reactor vessel was opened and the cooked wood chips were collected, drained of liquor, washed, screened and made ready for testing. Three cooks of low specific gravity wood chips were prepared, along with three cooks of non-low specific gravity wood.

EXAMPLE 2

PULPING PROCESS PARAMETERS FOR LOW SPECIFIC GRAVITY WOOD

One cook for low specific gravity wood chips had the following parameters.

TABLE 1

| | |
|---|---|
| Wood Chip S.G. | 0.410 |
| Pre-Steam @ 110 C., minutes | 5 |
| Impregnation: | |
| Time, minutes | 35 |
| % Effective Alkali, initial | 8.5 |
| % EA, second @ 5 minutes | 1.6 |
| % sulfidity | 29 |
| Liquor ratio | 4 |
| Temperature - degrees C. | 110 |
| Residual, G/L EA | 9.63 |
| Residual, % EA | 3.85 |
| PH | 12.77 |
| H-factor | 2 |
| Pressure Relief Time, Minutes | 3 |
| Co-Current: | |
| % Effective Alkali | 4.2 |
| % sulfidity | 29 |
| liquor addition time, minutes | 1 |
| temperature - degrees C. | 154 |
| time to, minutes | 9 |
| time at, minutes | 5 |
| temperature - degrees C. | 170 |
| time to, minutes | 51 |
| time at, minutes | 3 |
| residual, G/L EA | 9.42 |
| residual, % EA | 3.77 |
| PH | 12.92 |
| H-Factor | 649 |
| Counter-Current: | |
| % effective alkali | 8 |
| % sulfidity | 29.2 |
| temperature - degrees C. | 171 |
| time to, minutes | 54 |
| time at, minutes | 0 |
| temperature - degrees C. | 171 |
| time to, minutes | 0 |
| time at, minutes | 162 |
| EA, G/L - strength | 16.0 |
| displacement rate, CC/M | 93 |
| displacement volume, liters | 20.00 |
| residual, G/L EA | 9.95 |
| residual, % EA | 3.98 |
| PH | 12.74 |
| H-factor | 3877 |
| Total Time, Minutes | 319 |
| % Effective Alkali - Total Cook | 22.3 |
| Accepts, % on O.D. Wood | 41.01 |
| Rejects, % on O.D. Wood | 0.03 |
| Total Yield, % on O.D. Wood | 41.04 |
| Kappa Number, 10 Minutes | 16.80 |

EXAMPLE 3

BLEACHING PROCESS FOR LOW SPECIFIC GRAVITY WOOD

The pulp made by the process of Example 2 was bleached according to the following procedure.

O Stage

Inwoods low specific gravity wood chips were pulped into an alkaline Kraft pulp with a kappa number of 16.8 (TAPPI Standard T236 cm-85 and a viscosity of 239 cP (TAPPI T230). The brownstock pulp was treated with oxygen in a pressure vessel with high consistency mixing capabilities. The vessel was preheated to about 120° C. An amount of sodium hydroxide (NaOH) equivalent to 100 pounds per ton of pulp was added to the alkaline pulp. The reaction vessel was then closed and the pressure was increased to 60 psig by introducing oxygen into the pressure vessel. Water was present in the vessel in an amount sufficient to provide a 10% consistency.

After 45 minutes, the stirring was stopped and the pulp was removed from the pressure vessel and washed. The resulting washed pulp viscosity was 35.3 cP, and had a kappa number of 3.8.

D Stage

The D stage treated the pulp processed in the O stage by washing it three times with distilled water, pin fluffing the pulp, and then transferring the pulp to a polypropylene bag. The consistency of the pulp in the polypropylene bag was adjusted to 10% with the addition of water. Chlorine dioxide corresponding to an amount equivalent to 28.4 pounds per ton of pulp was introduced to the diluted pulp by dissolving the chlorine dioxide in the water used to adjust the consistency of the pulp in the bag. The bag was sealed and mixed and then held at 75° C. for 30 minutes in a water bath. The pulp was removed and washed with deionized water.

$E_p$ Stage

The washed pulp from the D stage was then placed in a fresh polypropylene bag and caustic was introduced with one-half of the amount of water necessary to provide a consistency of 10%. Hydrogen peroxide was mixed with the other one-half of the dilution water and added to the bag. The hydrogen peroxide charge was equivalent to 40 pounds per ton of pulp. The bag was sealed and mixed and held for 55 minutes at 88° C. in a water bath. After removing the pulp from the bag and washing it with water, the mat was filtered and then placed back into the polypropylene bag and broken up by hand.

D Stage

Chlorine dioxide was introduced a second time to the pulp in an amount equivalent to 19 pounds per ton of pulp with the dilution water necessary to provide a consistency of 10%. The bag was sealed and mixed, and then held for 3 hours at 88° C. in a water bath. The treated pulp had a copper number of about 0.9 measured by TAPPI Standard T430 and had a hemicellulose (xylan and mannan) content of 12.7%.

EXAMPLE 4

Low specific gravity wood having a specific gravity of 0.410 was pulped using the Kraft process, and subsequently, bleached and treated with varying amounts of oxygen to reduce its viscosity. Components in the pulps made using Inwoods low specific gravity wood chips are 7.2% xylans and 5.5% mannans.

Table 2 shows the results for three different cooking conditions. While brownstock pulp WAFL is provided, it is apparent that bleaching the brownstock pulp to reduce its viscosity without substantially reducing the hemicellulose content, in accordance with the conditions of the present invention, will not result in any appreciable increase in the bleached pulp WAFL and may in fact be lower than the brownstock pulp WAFL.

TABLE 2

| | Inwoods chips Cook A | Inwoods chips Cook B | Inwoods chips Cook C |
|---|---|---|---|
| Chips Specific Gravity | 0.410 | 0.410 | 0.410 |
| Kappa of Brownstock | 24.4 | 20.1 | 16.8 |
| Yield % | 43.2 | 41.4 | 41.0 |
| Brownstock pulp viscosity (cP) Falling Ball | 414 | 235 | 153 |
| Brownstock pulp WAFL (mm) | 2.70 | 2.70 | 2.69 |
| Brownstock pulp Coarseness (mg/100 m) | 18.3 | 17.9 | 17.6 |

TABLE 2-continued

|  | Inwoods chips Cook A | Inwoods chips Cook B | Inwoods chips Cook C |
|---|---|---|---|
| O2 pulp viscosity cP (100 lbs/ton NaOH) | 55 7.6 kappa | 34 6.0 kappa | 28 3.8 kappa |
| O2 pulp viscosity cP (60 lbs/ton NaOH) | 80 6.0 kappa | 63 7.5 kappa | 49 5.6 kappa |
| Bleached pulp coarseness (mg/100 m) | 32.4 |  | 21.8 |
| Bleached pulp fibers/g × 10$^6$ | 4.8 |  | 4.6 |
| Bleached pulp viscosity (cP) | 31.8 |  | 29.5 |
| Bleached pulp intrinsic viscosity | 4.1 |  | 4.2 |
| Bleached pulp Cu (ppm) | 0.6 |  | <0.6 |
| Bleached pulp Fe (ppm) | 12 |  | 14.3 |
| Bleached pulp Mn (ppm) | 1.5 |  | 3.6 |
| Bleached pulp Cr (ppm) | <0.4 |  | <0.3 |
| Bleached pulp Si (ppm) | 41 |  | 31 |

COMPARATIVE EXAMPLE 5

PULPING PROCESS PARAMETERS FOR NON-LOW SPECIFIC GRAVITY WOOD

A conventional Tolleson wood chip made from wood having specific gravity of 0.495 was pulped using a Kraft process and subsequently treated with varying amounts of oxygen to reduce its viscosity. Table 3 shows the pulping conditions for one cook of Tolleson wood chips.

TABLE 3

| Wood Chips S.G. | 0.495 |
|---|---|
| Pre-Steam @ 110 C., minutes | 5 |
| Impregnation: | |
| time, minutes | 35 |
| % Effective Alkali, initial | 8.5 |
| % EA, second @ 5 minutes | 1.6 |
| % sulfidity | 30.5 |
| liquor ratio | 4 |
| temperature - degrees C. | 110 |
| residual, G/L EA | 9.17 |
| residual, % EA | 3.67 |
| PH | 13.24 |
| H-factor | 2 |
| Pressure Relief Time, Minutes | 2 |
| Co-Current: | |
| % Effective Alkali | 4.2 |
| % sulfidity | 30.5 |
| liquor addition time, minutes | 1 |
| temperature - degrees C. | 157 |
| time to, minutes | 14 |
| time at, minutes | 0 |
| temperature - degrees C. | 170 |
| time to, minutes | 54 |
| time at, minutes | 0 |
| residual, G/L EA | 8.31 |
| residual, % EA | 3.32 |
| PH | 13.07 |
| H-Factor | 680 |
| Counter-Current: | |
| % Effective Alkali | 8 |
| % sulfidity | 30.0 |
| Temperature - degrees C. | 171 |
| Time to, minutes | 54 |

TABLE 3-continued

| Time at, minutes | 0 |
|---|---|
| Temperature - degrees C. | 171 |
| Time to, minutes | 0 |
| Time at, minutes | 162 |
| EA, G/L - strength | 20.4 |
| Displacement rate, CC/M | 73 |
| Displacement volume, liters | 15.87 |
| Residual, G/L EA | 9.72 |
| residual, % EA | 3.89 |
| PH | 13.18 |
| H-factor | 3975 |
| Total Time, Minutes | 319 |
| % Effective Alkali - Total Cook | 22.3 |
| Accepts, % on O.D. Wood | 44.23 |
| Rejects, % on O.D. Wood | 0.13 |
| Total Yield, % on O.D. Wood | 44.36 |
| Kappa Number, 10 Minutes | 17.75 |

Table 4 shows the results of three different cooks using a conventional Tolleson wood chip made from a non-low specific gravity wood. Components in the pulps made using Tolleson non-low specific gravity wood chips are 6.5% xylose; 6.6% mannose; 5.7% xylans; and 5.9% mannans.

TABLE 4

|  | Tolleson chips Cook A | Tolleson chips Cook B | Tolleson chips Cook C |
|---|---|---|---|
| Chips Specific Gravity | 0.495 | 0.495 | 0.495 |
| Kappa of Brownstock | 26.9 | 20.8 | 17.8 |
| Yield % | 46.6 | 46.1 | 44.4 |
| Brownstock pulp viscosity (cP) Falling Ball | 633 | 358 | 243 |
| Brownstock pulp WAFL (mm) | 4.13 | 4.14 | 4.19 |
| Brownstock pulp Coarseness (mg/100 m) | 26.1 | 24.4 | 24.3 |
| O2 pulp viscosity cP (100 lbs/ton NaOH) | 96 6.4 kappa | 43 6.9 kappa | 41 4.7 kappa |
| O2 pulp viscosity cP (60 lbs/ton NaOH) | 180 8.3 kappa | 88 5.5 kappa | 70 6.2 kappa |
| Bleached pulp coarseness (mg/100 m) | 24.9 |  | 27.5 |
| Bleached pulp fibers/g × 10$^6$ | 3.8 |  | 2.8 |
| Bleached pulp viscosity (cP) | 28.5 |  | 24.2 |
| Bleached pulp intrinsic viscosity | 4.3 |  | 4 |
| Bleached pulp Cu (ppm) | <0.6 |  | <0.7 |
| Bleached pulp Fe (ppm) | 11.5 |  | 16 |
| Bleached pulp Mn (ppm) | 5 |  | 6 |
| Bleached pulp Cr (ppm) | <0.4 |  | 0.3 |
| Bleached pulp Si (ppm) | ≧1 |  | 32 |

It can be seen that the viscosity of the pulps made from the Inwoods low specific gravity wood chips is lower than the viscosity of the pulps made from the Tolleson non-low specific gravity wood chips.

It can be seen that the viscosity of the pulps made from the Inwoods low specific gravity wood chips is lower than the viscosity of the pulps made from the Tolleson non-low specific gravity wood chips.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for making a lyocell product, comprising:

dissolving a pulp in a solvent to form a cellulose solution;

forming a lyocell product from the solution; and regenerating the product, wherein the pulp comprises at least 7% by weight hemicellulose, a viscosity less than 32 cP, a copper number less than 2, a weighted average fiber length less than 2.7 mm, and a coarseness less than 23 mg/100 m.

2. The method of claim 1, wherein the method is one of meltblowing, centrifugal spinning, spun bonding, and dry-jet wet.

* * * * *